United States Patent
Cromer et al.

(10) Patent No.: US 8,381,304 B2
(45) Date of Patent: Feb. 19, 2013

(54) APPARATUS AND METHOD FOR ASSURING SECURE DISPOSAL OF A HARD DISK DRIVE UNIT

(75) Inventors: Daryl Cromer, Cary, NC (US); Howard Jeffrey Locker, Cary, NC (US); Randall S. Springfield, Chapel Hill, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 966 days.

(21) Appl. No.: 11/493,952

(22) Filed: Jul. 27, 2006

(65) Prior Publication Data

US 2008/0046998 A1 Feb. 21, 2008

(51) Int. Cl.
*G06F 21/00* (2006.01)
(52) U.S. Cl. .......................................... 726/26; 726/17
(58) Field of Classification Search .................. None
See application file for complete search history.

(56) References Cited

U.S. PATENT DOCUMENTS

| | | |
|---|---|---|
| 5,375,243 A | 12/1994 | Parzych et al. |
| 5,675,321 A | 10/1997 | McBride |
| 6,167,519 A | 12/2000 | Sonobe |
| 7,103,909 B1 * | 9/2006 | Kondo et al. ..................... 726/2 |
| 7,159,120 B2 * | 1/2007 | Muratov et al. ............... 713/182 |
| 7,216,235 B1 * | 5/2007 | Platt .............................. 713/182 |
| 7,373,559 B2 * | 5/2008 | Guha ............................... 714/54 |
| 2002/0026580 A1 * | 2/2002 | Igari ............................. 713/168 |
| 2003/0046593 A1 * | 3/2003 | Xie et al. ...................... 713/202 |
| 2003/0050940 A1 | 3/2003 | Robinson |
| 2003/0208696 A1 * | 11/2003 | Piwonka et al. ............. 713/202 |
| 2006/0253674 A1 * | 11/2006 | Zohar et al. .................. 711/165 |
| 2006/0278701 A1 * | 12/2006 | Matsushita et al. .......... 235/382 |
| 2007/0130434 A1 * | 6/2007 | Chu et al. ..................... 711/163 |

OTHER PUBLICATIONS

Peter T. McLean, Information Technology-AT Attachment with Packet Interface-5, (ATA/ATAPI-5), Jun. 15, 2000, pp. 34-40, T13 1321D, www.t13.org.

* cited by examiner

*Primary Examiner* — Philip Chea
*Assistant Examiner* — Carlton Johnson
(74) *Attorney, Agent, or Firm* — Ronald V. Davidge; Charles Bustamanti

(57) ABSTRACT

A hard disk drive unit includes a microprocessor programmed to erase data stored within the drive unit if it is determined that a process potentially leading to a misuse of the data stored within the drive unit, and if secure disposal configuration data stored in nonvolatile storage within the drive indicates that the data is to be erased. Such a process includes initializing the drive unit for operation without providing a password matching a password stored in the drive unit, initializing the drive unit in a system not having CMOS configuration data matching the drive unit, and determining that a failure rate within the drive unit exceeds a threshold level.

13 Claims, 5 Drawing Sheets

| SECURE DISPOSAL CONFIGURATION DATA ||
|---|---|
| SDE | SECURE DISPOSAL PROGRAM ENABLED |
| PWE | PASSWORD ENABLED |
| PWX | PASSWORD ERASE ENABLED |
| PWN | PASSWORD, NUMBER OF ATTEMPTS ALLOWED |
| PWU | PASSWORD, USER |
| PWM | PASSWORD, MASTER |
| MSE | MAXIMUM SECURITY ENABLED |
| NCE | NO MATCHING CMOS ENABLED |
| NCX | NO MATCHING CMOS, ERASE ENABLED |
| NCT | MAX TIME WITHOUT CMOS MATCH |
| ESX | EXCESSIVE SOFT ERRORS, ERASE ENABLED |
| EFE | ERASE FLAG ENABLED |

FIG. 2

| FLAGS ||
|---|---|
| SDF | SECURE DISP PROG FINISHED |
| SEF | SECURE ERASE FLAG |

FIG. 3

| FIG. 4A |
|---|
| FIG. 4B |

FIG. 4

APPARATUS AND METHOD FOR ASSURING SECURE DISPOSAL OF A HARD DISK DRIVE UNIT

BACKGROUND OF THE INVENTION

1. Field of the Invention

This invention relates to hard disk drive units for computer systems and, more particularly, to an apparatus and method for preparing such drives for disposal without compromising the information stored thereon.

2. Summary of the Background Art

Computer systems are often used to store confidential data on their hard disk drives, with the data being of particular value to the individual or organization owning the computer, and with potentially serious consequences being possible in the event that the data were to become available to others. Eventually, all hard disk drives must be somehow disposed. For example, within a computing system, a failing hard disk drive may be replaced with a new hard disk drive, or an older hard disk drive may be replaced with a upgraded hard disk drive having superior features, such as greater storage capacity and faster access speed. Furthermore, a hard disk drive may be part of a computer system that is disposed when it is replaced by newer equipment. Many individuals and organizations are hesitant to allow their hard disk drives or computer systems including hard disk drives to leave their premises for disposal because they perceive that data stored thereon may at some point become available to others. While data can sometimes be erased, or the hard disk drive reformatted, before disposal, often this is impossible because the computer system or the hard disk drive is inoperable.

Hard disk drive units that are returned to manufacturers during a disposal process are often repaired, tested, and sold as refurbished units. While the repair process naturally includes erasing any data remaining from the previous owner of the hard disk drive, a concern remains that a drive not handled property within the process may make its way through the process with such data intact. Therefore, what is needed is a way to ensure that such data will be erased by an automatic process.

In modern hard disk drive units, the electronics, including a controller, needed to perform drive functions, such as moving the drive heads to particular locations to read or write data, are included within the drive unit. This arrangement, which is known as IDE (Integrated Drive Electronics) provides a number of advantages over the former method of providing a controller that is external to the hard disk drive but connected to the drive by a ribbon cable. With IDE, there is no need to match the disk drive mechanism with a the features of a separate controller, and the analog signals causing movement of the magnetic heads, that are subject to receiving noise travel a shorter path in an area that is more easily shielded. Since the drive electronics is now included within the hard disk drive, it is a part of the unit that is disposed when a different hard disk drive is installed or when the computer system itself is disposed. Thus, what is needed is a method for using the electronics that is part of the hard disk drive to ensure that data recorded on a hard disk drive being disposed will the erased by an automatic process.

Communications to an IDE drive typically occur over an ATA (AT Attach) bus, which functions according to ATA specifications controlled by an industry committee identified as the Technical Committee T13. During 1995, support for optionally providing a security mode feature through the use of a password stored in a hard disk drive unit was added to the ATA-3 specification, with such support remaining in more recently issued ATA specifications. Various manufacturers provide hard disk drive units with this security feature, generally for use in laptop computers. The ATA security mode feature set is a password system that restricts access to user data stored on a device. This system uses a User Password and a Master Password, with the security system being enabled when a user password is sent to be stored on the hard disk drive unit. When the security system is enabled, access to user data stored on the hard disk drive unit is denied after a power off/on cycle until the User Password is sent to the device. For example, a graphical prompt for entering the User Password is presented on the display screen during the boot process, before the operating system is loaded. A Master Password may be set in addition to the User Password, providing the system administrator with a method for unlocking the hard disk drive unit without the User Password. With the security system enabled, a security level is set either to High, so that the Master Password can be used to unlock the hard disk drive unit for recovering the data if the User Password is lost, or to Maximum, so that the Master Password without the User Password can only unlock the hard disk drive unit to erase the data.

With this ATA security mode feature enabled on a hard disk drive unit, a correct password must be used to gain access to the data, even if the hard disk drive unit is moved to another computer system that does not support the security mode feature. However, the data remains on the hard disk drive unit, and it is not impossible to recover the data by defeating the security feature. In fact, it is understood that at least one company will unlock such a hard disk drive unit without the password if proof of ownership is sent with the drive. Thus, what is needed is a method to specify circumstances under which the data stored on an hard disk drive unit will automatically be erased to prevent its recovery.

The patent literature includes a number of patents describing methods for preventing unauthorized access to data stored on a hard disk drive. For example, U.S. Pat. No. 5,375,243 describes a hard disk drive which prevents data access operations on the hard disk drive upon power up until the user enters a password. When the computer system is powered up, the hard drive spins up and is tested, responding only to a limited set of commands that do not permit data storage or retrieval operations. The password is located on the hard disk itself to prevent bypassing the hard disk drive's security using a new computer environment. When the user enters the correct password, the hard drive unlocks and operates as a conventional hard drive. If the user chooses, the hard drive may be unlocked by either of two passwords, one defined by the user and the other by the manufacturer. To obtain access to data areas during a locked state, a wipe data command is provided which overwrites all user data on the drive and unlocks the drive. However, unless the user chooses to use the wipe data command, the data remains on the hard disk drive unit, where it may be recovered, even with great difficulty. Thus, again what is needed is a method to specify circumstances under which the data stored on an hard disk drive unit will automatically be erased to prevent its recovery, so that a user with sensitive data has a way to know that his data will not be left in a potentially recoverable state if the hard disk drive unit is removed from his computer system.

Other patents describe security actions, including erasing stored data, which takes place within a computing system when certain events, that could indicate an attempt to surreptitiously read the stored data, take place. For example, U.S. Pat. No. 6,167,519 describes a system for erasing secret stored information, with the system being activated by a switch when a cover of a computing system is removed. U.S.

Pat. No. 5,675,321 describes a system that can reformat a hard disk drive so that stored data is obliterated in response to a determination that the continuity of a connection between the computer and a telephone line has been broken for longer than a predetermined time, indicating that the computer is being moved. What is needed is a method for automatically erasing information stored during the operation of a hard disk drive unit within another computing system without otherwise impeding or altering the use of the computing system.

SUMMARY OF THE INVENTION

According to one aspect of the invention, a method is provided for causing data stored within a hard disk drive unit to be erased. The method includes storing secure disposal configuration data in nonvolatile storage within the hard disk drive unit, determining that a process potentially leading to a misuse of the data stored within the hard disk drive unit has occurred, and erasing the data stored within the hard disk drive unit. Such a process is taken from a group including initializing the hard disk drive unit for operation without providing a password matching a password stored within the hard disk drive unit, initializing the hard disk drive unit for operation in a computer system not having CMOS configuration data matching the hard disk drive unit, and determining that a failure rate occurring within the hard disk drive unit during operation of the hard disk drive unit exceeds a threshold level. The process for erasing the data stored within the hard disk drive unit may include setting a nonvolatile bit so that the erasing process will continue if electrical power is turned off and then restored to the hard disk drive unit.

The term "hard disk drive unit," as used herein, is understood to mean a typically enclosed unit that is generally replaced when it is determined that a failure has occurred within the unit or that there is a need to upgrade the unit. The term "initialization," as used herein, is understood to mean preparing a computer system or a peripheral device, such as a hard disk drive unit for operation in response to turning on electrical power to the system or device.

Preferably, the secure disposal configuration data includes a plurality of variables, with individual variables within the secure disposal configuration data indicating which individual processes are used to determine that a process potentially leading to a misuse of the data stored within the hard disk drive unit has occurred.

For example, a determination that the hard disk drive unit is being initialized for operation in a computer system not having CMOS configuration data matching the hard disk drive unit comprises determining that electrical power has been applied to the hard disk drive unit for a period of time exceeding a predetermined minimum time in a computer system not having CMOS configuration data matching the hard disk drive unit.

Preferably, the hard disk drive unit is locked, so that the data stored within the hard disk drive unit cannot be read, before the hard disk drive unit is initialized for operation. The hard disk drive unit is then unlocked, so that the data stored within the hard disk drive unit can be read, in response to determining that a password provided as an input during initializing the hard disk drive matches a password stored within the hard disk drive unit. For example, a determination that the hard disk drive unit is being initialized for operation without providing a password matching a password stored within the hard disk drive unit comprises determining whether a password provided as an input matches either a user password or a master password stored in the hard disk drive unit.

BRIEF DESCRIPTION OF THE FIGURES

FIG. 2 is a table listing configuration data stored within the hard disk drive unit of FIG. 1;

FIG. 3 is a table listing flag bits used within the hard disk drive unit of FIG. 1;

DETAILED DESCRIPTION OF THE INVENTION

Figure 1:
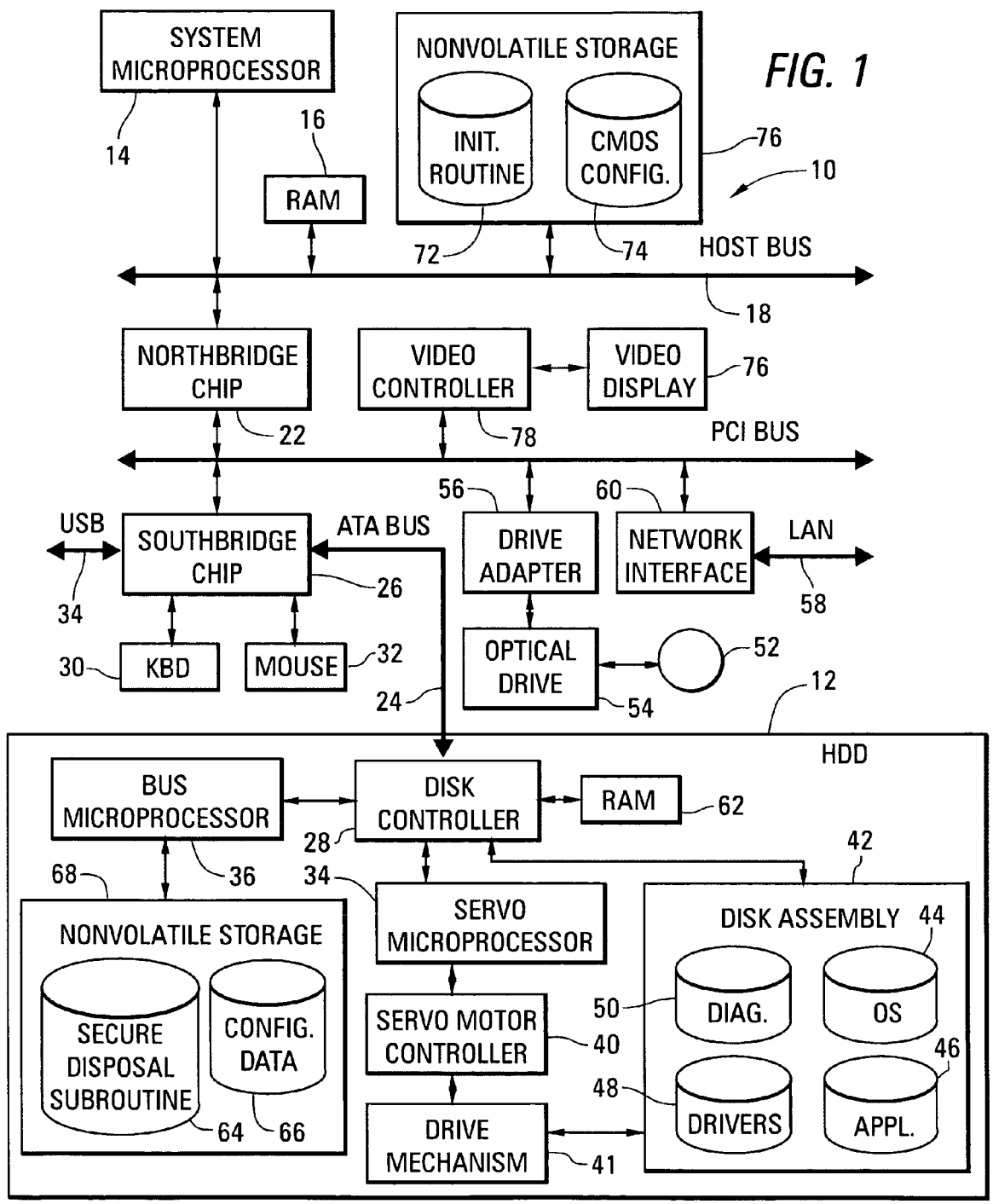
FIG. 1 is a block diagram of a computer system including an hard disk drive unit built in accordance with the invention.

FIG. 1 is a block diagram of a computer system 10 including an hard disk drive unit 12 built in accordance with the invention. The computer system 10 includes a system microprocessor 14 executing instructions stored within a random access memory 16 connected to the system microprocessor 14 by a host bus 18. The host bus 18 is also connected to a PCI (Peripheral Component Interconnect) bus 20 through a Northbridge chip 22, which conditions signals traveling in either direction between the host bus 18 and the PCI bus 20. The PCI bus 20 is additionally connected to at least one ATA bus 24 through a Southbridge chip 26, which conditions signals traveling in either direction between the PCI bus 20 and the ATA bus 24. The ATA bus 24 is particularly configured for the attachment of an IDE device such as the hard disk drive unit 12, with data being driven to and from a disk controller 28 within the hard disk drive unit 12. Busses of this type are often called IDE or EIDE buses. Typically, the Southbridge chip 26 includes two ATA busses 24, so that two hard disk drive units 12 can be attached within the computer system 20, together with connections for ports attaching a keyboard 30 and a mouse 32, and a USB (Universal Serial Bus) port 34.

Within this hard disk drive unit 12, a bus microprocessor 36 operates with the disk controller 28 to process signals transmitted along the ATA bus 24. The hard disk drive unit 12 additionally includes a servo microprocessor 38, operating with a servo motor controller 40 to drive the drive mechanism 41 used to read and write data stored on the disk assembly 42, including, for example, an operating system 44 and a number of application programs 46. The data 42 also includes device drivers 48, for operation of various peripheral devices within and attached to the computer system 10, and diagnostic subroutines 50 for testing these peripheral devices during an initialization process occurring after the computer system 10 is turned on.

For peripheral devices forming portions of the computer system 10 as it is manufactured, device drivers 48 and diagnostic subroutines 50 are typically installed within the data 42 during the manufacturing process. Later, these device drivers 48 and diagnostic subroutines 50 are typically installed within the data 42 when a new associated peripheral device is installed within the computer system 10, with the presence of the peripheral device needing such data being detected by the operating system 44, and with the device drivers 58 and diagnostic subroutines 50 being loaded from data accessed by the operating system 44, or from data supplied on a computer readable medium, such as a compact disk 52, shipped with the peripheral device to be read within an optical drive 54 attached to the PCI bus 20 through a drive adapter circuit 56. Alternately, the device drivers 48 and diagnostic subroutines 50 are loaded for use with such a new peripheral device in the form of a computer data signal embodied in a carrier wave and transmitted along a network 58 connected to the PCI bus 20 through a network adapter 60. Thus, a number of methods are provided for allowing data to be transmitted to the computer system 10 when a new peripheral device is installed.

The hard disk drive unit 12 additionally includes random access memory 62 for holding data and instructions for programs executing within the bus microprocessor 36 and the servo microprocessor 38. In accordance with the invention, the bus microprocessor 36 has access to a secure disposal subroutine 64 and configuration data 66 stored within the hard disk drive unit 12 in nonvolatile storage 68. Such nonvolatile storage 68 may be implemented by using flash memory, by using CMOS with a battery back-up, by recording data as a part of a protected portion of the data 42 stored on disk, or by using a combination of such methods.

The computer system 10 also includes nonvolatile storage 70 storing an initialization routine 72 and CMOS configuration data 74. The BIOS routine 72 is used for initialization of the computer system 10 after power is turned on, with the initialization process including the execution of diagnostic procedures testing the operation of peripheral devices. Typically, the initialization process is begun using BIOS instructions read from a read-only memory forming part of the nonvolatile storage 70 and continued with instructions from the data 42 stored on disk, with the operating system 44 being loaded from the data 42 upon successful completion of the initialization process. The CMOS configuration data 74 is used to configure the operation of various devices within, and attached to, the computer system 10. For example, the CMOS configuration data 74 includes ATA configuration data determining the operation of ATA devices, such as the hard disk drive unit 12 and the optical drive 54. Such configuration data for the hard disk drive unit 12 may be written to the CMOS configuration data 74 during the process of manufacturing the manufacturing the computer system 12 is the hard disk drive unit 12 is part of the original configuration of the system 12. Alternately, such configuration data for the hard disk drive 12 is added to the CMOS configuration data 74 when the hard disk drive unit 12 is installed, being supplied as data written on an optical disk 52 or in the form of data transmitted over the LAN 58.

By methods well known to those skilled in the arts of computer design and configuration, methods are provided for first identifying, and later recognizing, a system administrator and a system user, with various privileges for accessing and modifying data stored within the computer system 10 being accorded to the system administrator, and with other such privileges being accorded the system user. For example, the system administrator is provided with an ability to read and change the CMOS RAM configuration data 74, including an ability to set and change an administrative password, while the system user is provided with an ability to set and change a user password. Preferably, when a password is required during a process of initializing the computer system 10 following power-on, a password prompt is displayed on the screen of a video display 76 connected to the PCI bus 78 by means of a video controller 78.

Figure 4A:
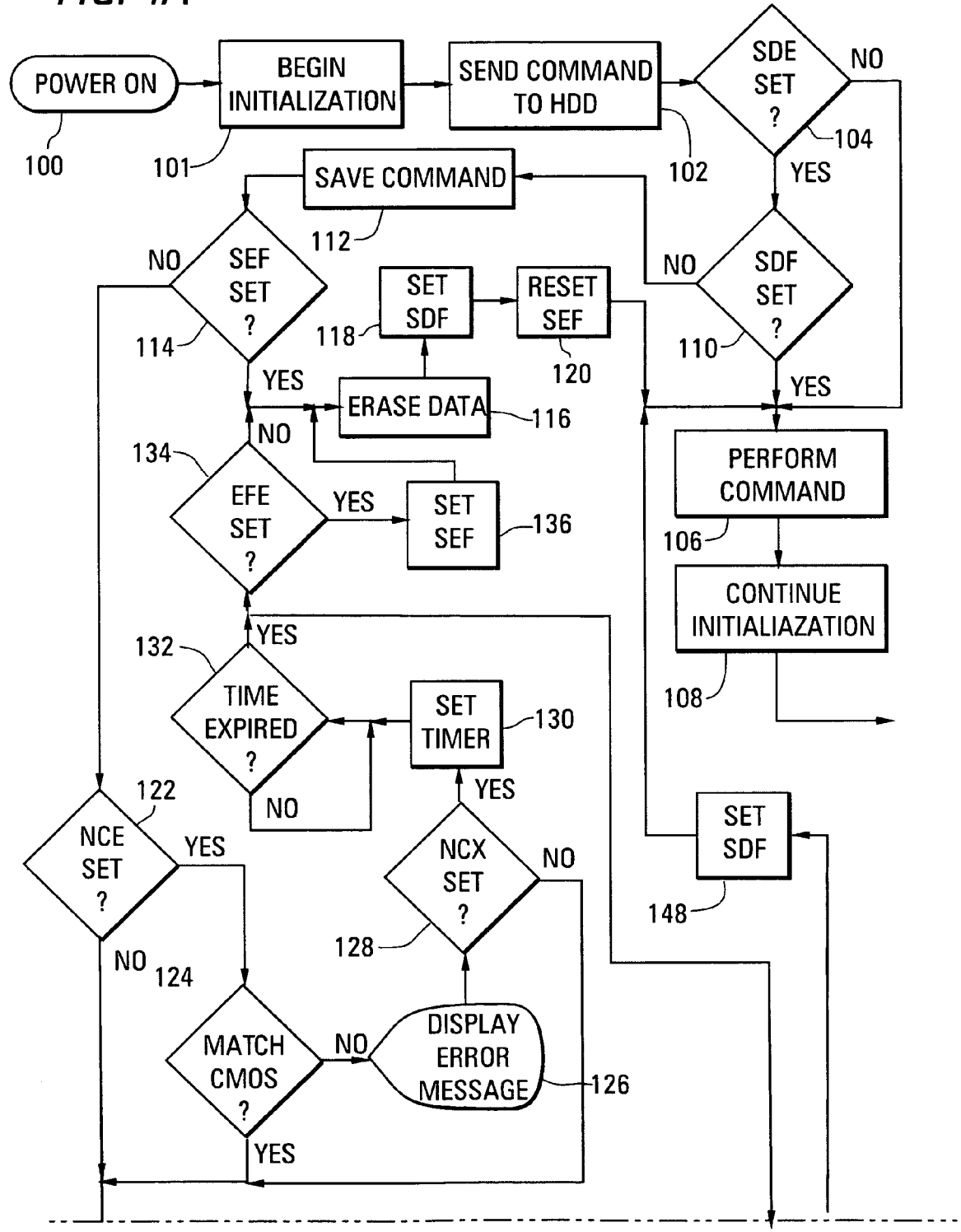
FIG. 4 is a flow chart showing processes occurring during the initialization of the computer system of FIG. 1 following a power-on cycle, with FIG. 4 being divided into an upper portion, indicated as FIG. 4A, and a lower portion, indicated as FIG. 4B.
Figure 4B:
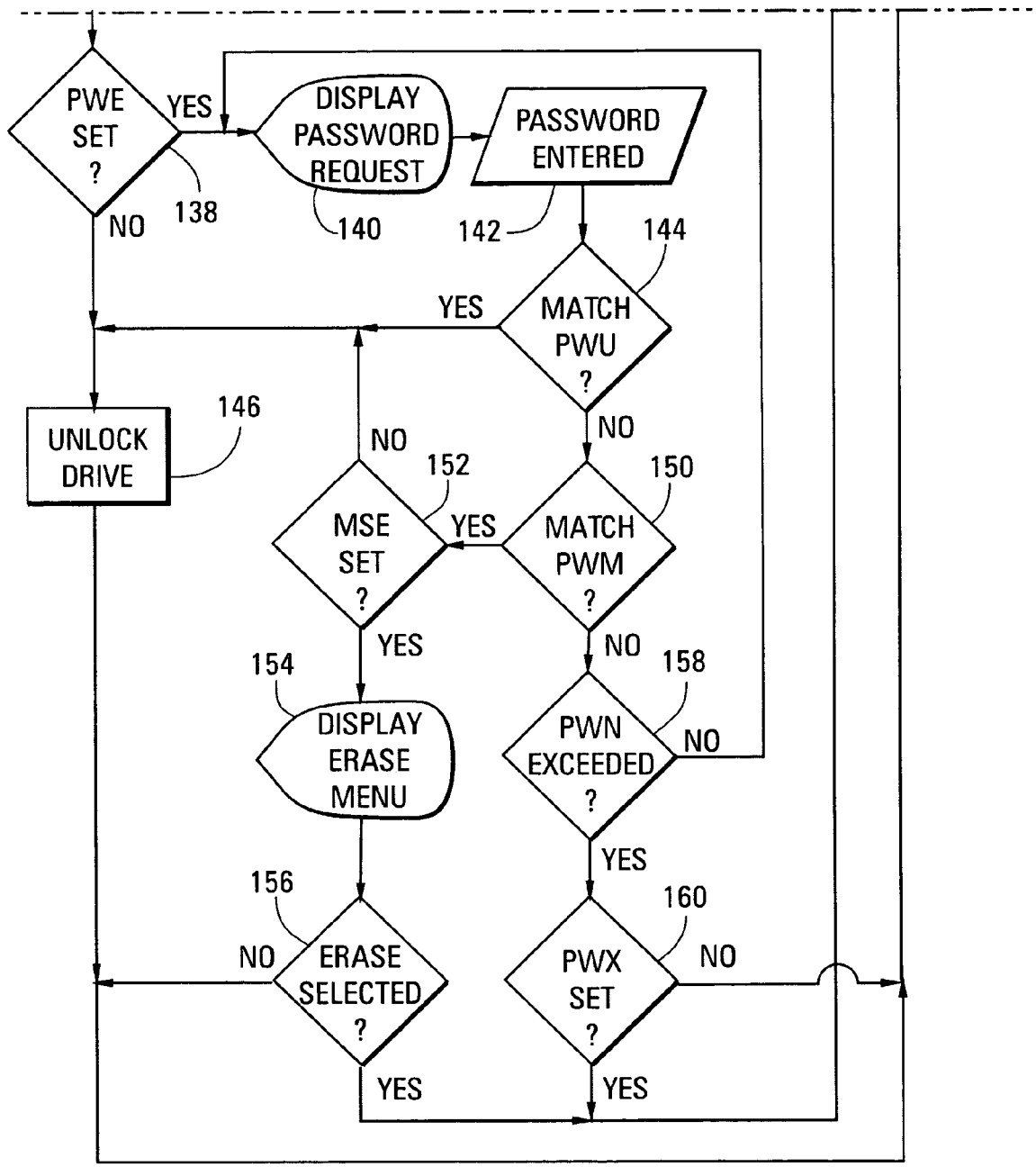

Operation of the computer system 10 and the hard disk drive unit 12 in accordance with the invention to assure that the hard disk drive unit 12 will be disposed in a secure manner, when such disposal is eventually required, will now be discussed, with continued reference being made to FIG. 1, and with additional reference being made to FIGS. 2-4. FIG. 2 is a table listing elements of the configuration data 66 stored within the nonvolatile storage 68 of the hard disk drive unit 12. FIG. 3 is a table listing flag bits used within the hard disk drive unit 12. FIG. 4 is a flow chart of processes occurring during the initialization of the computer system 10 following a power-on cycle, with the system microprocessor 14 executing instructions stored in the bios routine 72 and in diagnostic subroutines 50, and with the bus microprocessor 36 executing instructions stored within the secure disposal subroutine 64. FIG. 4 is divided into an upper portion, indicated as FIG. 4A, and a lower portion, indicated as FIG. 4B.

The initialization process of FIG. 4 begins with the power being turned on to the computer system 10 in step 100, then in a portion of the initialization process indicated as 101, the initialization process is begun, at first with instructions from the bios routine 72, and then, typically, with data, including the diagnostic subroutines 50, stored on the disk assembly 42. Then, in step 102, the first command during the initialization process is sent to the hard disk drive unit 12, with a determination then being made in step 104 of whether the SDE configuration bit has been set, indicating that the process of executing the secure disposal subroutine 64 has been enabled. If it is determined in step 104 that the SDE configuration bit has not been set, the initialization process proceeds to step 106, in which the command sent in step 102 is performed, followed by the remaining portion of the initialization process, indicated as 108, with the operating system 44 typically being loaded at the end of the initialization process.

On the other hand, if it is determined in step 104 that the SDE configuration bit has not been set, a further determination is made in step 110 of whether the SDF flag bit has been, indicating that the secure disposal subroutine 64 has already been run following the present power-on cycle in step 100. If it has been set, there is no need to run the secure disposal subroutine 64 again, so the initialization process instead proceeds to step 106 to perform the command sent in step 102.

If it is determined in step 104 that the SDF has not been set, the secure disposal subroutine 64 is run, with instructions being executed within the bus microprocessor 36 in the hard disk drive unit 12. First, the command sent in step 102 is saved in step 112 for later execution. Next, a determination is made in step 114 of whether the SEF flag has been set, indicating that a secure erase function was started to erase data on the hard disk drive unit 12 before power was shut off, delaying the erasing process. If this flag has been set, the data is erased in step 116, with the initialization process then proceeding to step 118, in which the SDF flag is set to indicate that the secure disposal subroutine 64 has been completed, and to step 120, in which the SEF flag is reset. After the data has been erased in step 118, there is no need to perform additional functions within the secure disposal subroutine 64. The initialization routine then proceeds to step 106 to perform the command stored in step 102.

The performance of the command stored in step 102 and of other commands within the continuing portion 108 of the initialization process may be impossible after the erasure of data in step 112, but preferably such a problem will be adequately described by resulting error messages. In this regard, it is noted that the data erased in step 116 may be all of the data recorded in the hard disk drive unit 12, or only data identified as being sensitive, being located, for example, in a particular partition within the hard disk drive unit 12. It is further noted that, while FIG. 1 shows the hard disk drive unit 12 as a single hard disk drive unit storing the operating system 44, and therefore as the primary drive from which the boot process occurs, the hard disk drive unit 12 may instead be only one of several hard disk drive units within a computer system, so that normal processes within the computer system can occur after the erasure of date in step 112.

If it is determined in step 114 that the SEF flag has not been set, a further determination is made in step 122 of whether the NCE configuration bit has been set to enable a security process resulting from a determination that the CMOS RAM 74 does not match the hard disk drive unit 12, indicating that the hard disk drive unit 12 has been installed in a computer system 10 different from the computer system in which it was originally placed. Such an event could occur as a result of an attempt to steal data by moving the hard disk drive unit to a different computer system or as a result of the hard disk drive unit 12 being installed as a replacement hard disk drive unit with an inadvertent failure to erase the data. If the NCE configuration bit has been set, a further determination is made in step 124 of whether the CMOS RAM 74 matches the hard disk drive unit 12. If it does not, an error message is displayed on the video display 76 in step 126, with yet a further determination being made in step 128 of whether the NCX configuration bit has been set, indicating that data stored in the hard disk drive unit 12 should be erased following a time stored in the form of a configuration variable NCT. Thus, if the NCX configuration bit is set, a timer is set in step 130, with a subsequently elapsed time being compared to the time allowed by the NCT configuration variable in step 132. If this process is not stopped by turning off the power to the computer system 10, when this time expires, a determination is made in step 134 of whether the EFE configuration bit has been set to enable setting the SEF secure erase flag bit. If it has, the SEF secure erase flag bit is set in step 136. Regardless of the condition of the EFE bit, after it is determined in step 132 that the available time has expired, the data is erased in step 116.

The process for setting the SEF secure erase flag can be implemented within the HFF 12 in a number of well known ways for preventing the resetting or erasure of data when electrical power is turned off. For example, a flash memory bit can be used, or a CMOS bit may be used, with battery back-up may be used. In any case, setting the SEF flag ensures that the process of erasing data proceeds to completion after it is started, since it cannot be stopped by turning the power off and back on. Thus, the SEF bit can only be reset in step 120, after the data has been erased in step 116. If the SEF bit has not been set before step 120, this resetting process has no effect.

Preferably, the optional Security Mode features of the ATA specifications is provided within the hard disk drive unit 12, with support being provided for storing a user password, to be supplied by the system user, in the form of a configuration variable PWU, a master password, to be supplied by the system administrator, in the form of a configuration variable PWM, and a maximum security enabled configuration bit MSE. When MSE is set, the user password is required to unlock the hard disk drive unit 12 for reading the data, with the use of the master password only providing a capability to perform a security erase. When the MSE is not set, the hard disk drive unit 12 can additionally be unlocked for reading the data using the master password. In addition to providing these optional Security Mode features of the ATA specifications, a preferred version of the invention provides for a configuration variable PWX, which can be set to cause the erasure of data if such password data is not supplied during the initialization process.

Thus, if it is determined in step 122 that the NCE configuration bit has not been set, or if it is determined in step 124 that the CMOS RAM matches the hard disk drive unit 12, the initialization process proceeds to step 138 to determine whether the PWE configuration bit has been set to enable a process for comparing a user input with a password stored in the hard disk drive unit 12. If it has been set, a request for password entry is displayed on the video display 76 in step 140. For example, instructions for displaying the password request on the video display 76 may have been loaded with the diagnostics 50 or other data when the hard disk drive was installed. Then, after the user if provided with an opportunity to enter a password in step 142, a determination is made in step 144 of whether the entered password matches the user password, which has been stored in the form of the configuration variable PWU. If it does, the hard disk drive unit 12 is unlocked in step 146, and the SDF flag bit is set in step 148 to indicate that execution of the secure disposal subroutine has been completed, before proceeding to step 106 to perform the command stored in step 102 and continuing with the initialization process in step 108.

If it is determined in step 144 that the password entered in step 142 does not match the user password, a further determination is made in step 150 of whether the password entered in step 142 matches the stored master password, which is represented by the configuration variable PWU. If it does, it is then determined in step 152 whether the MSE configuration bit has been set to enable the maximum security condition. If the MSE configuration bit has not been set, the master password is determined to be sufficient for unlocking the HFF 12 in step 146 and proceeding with the initialization process. If the MSE configuration bit has been set, the master password, without the user password, can only be used to establish a data erasing process, so an erase menu is displayed on the screen of the display device 76 in step 154. If this erase process is not selected, as then determined in step 156, the SDF flag bit is set in step 148, with the command sent in step 102 being performed in step 106, and with the initialization process being continued in step 108, but without the hard disk drive unit 12 being unlocked. If it is determined in step 156 that the erase process has been selected, the data is erased in step 136, allowing the master password to be used to prepare the hard disk drive unit 12 for another purpose or another user.

If it is determined in steps 144 and 150 that the password entered in step 142 is neither the user password nor the master password, a further determination is made in step 158 of whether the number of allowed tries for entering the password, represented by the configuration variable PWN, has been exceeded. If it has not, the process returns to step 140 to allow another attempt at entering the correct password. If this number has been exceeded, it is determined in step 160 whether the configuration variable PWX has been set to require the erasure of data when this number of tries has been exceeded. If it has been set, data is erased in step 116, with the SEF flag additionally being set in step 136 if the EFE configuration bit is set. Again, the SDF is set after erasure, with the SEF being reset, and with the initialization process continuing in steps 106 and 108. On the other hand, if the PWX configuration variable is not set, the SDF flag bit is set in step 148, with the command sent in step 102 being performed in step 106, and with the initialization process being continued in step 108, but without the hard disk drive unit 12 being unlocked.

In accordance with a preferred version of the invention, the hard disk drive unit 12 additionally includes a method for determining when a failure of the processes occurring within the hard disk drive unit 12 is imminent. For example, such a determination is made when it is determined that soft errors, which can be corrected by repeated re-trials, are occurring at an excessive rate, exceeding a threshold level. Such a condition is understood to result from a general problem that will soon cause the disposal of the hard disk drive unit, while hard errors, which cannot be corrected by re-trials, generally indicate a problem with a particular area on the disk, which can be corrected by marking that area or sector as bad.

Figure 5:
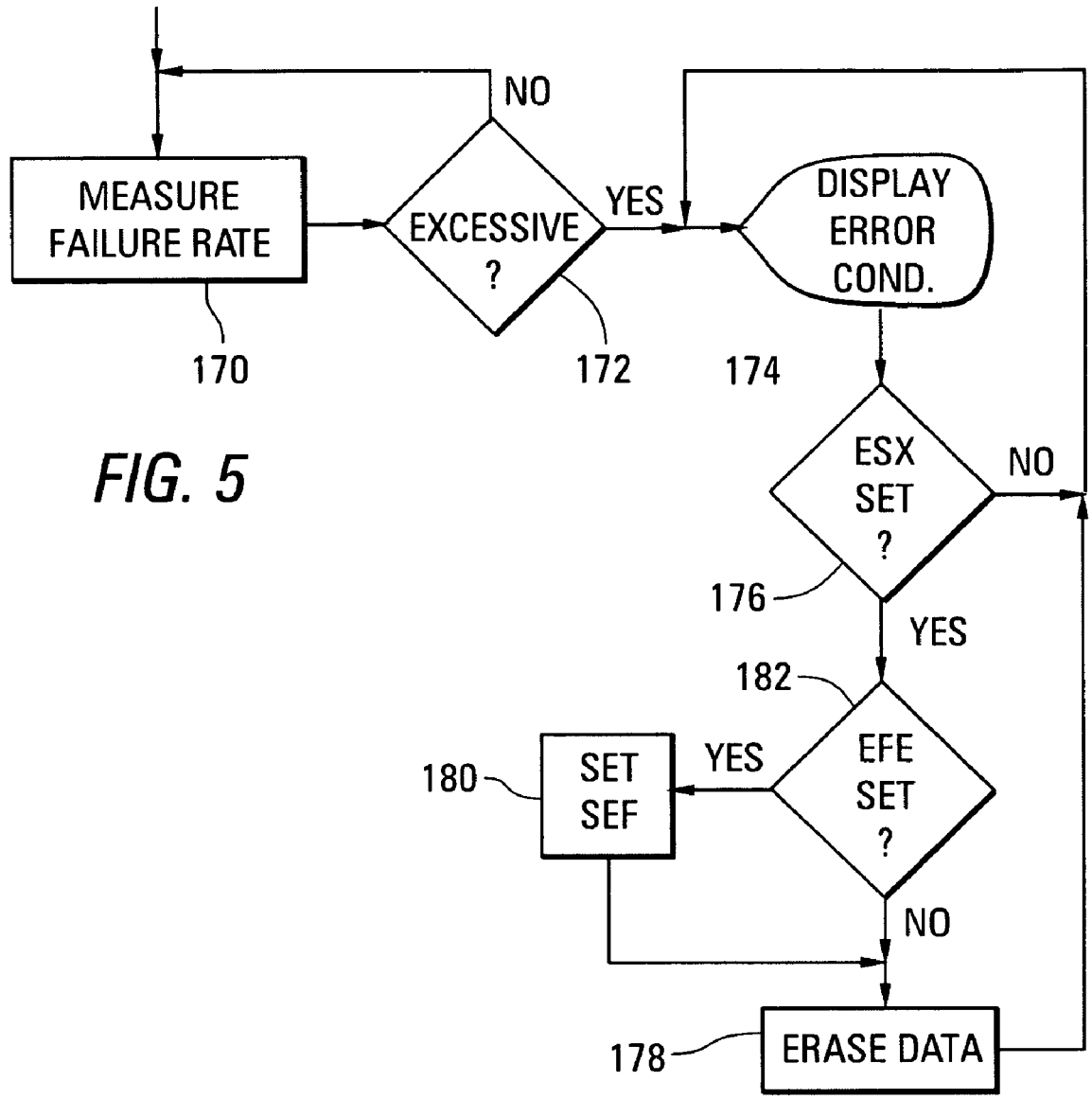
FIG. 5 is a flow chart of processes occurring in response to a determination that an excessive soft error rate exists within the hard disk drive unit of FIG. 1.

FIG. 5 is a flow chart of processes occurring, in a preferred embodiment of the invention, within the hard disk drive unit 12, with a failure rate, such as a soft error rate, being measured in real time in step 170, and following a determination, in step 172 that the failure rate is excessive. Then, in step 174, an indication of the error condition is displayed on the screen of the display device 76. Next, in step 176, a determination is made of whether the ESX configuration bit (listed in FIG. 2) has been set to enable a process for erasing the data on the hard disk drive unit 12 in the event that such a failure condition is established, so that such data will not be present when the hard disk drive unit 12 is disposed. If this ESX configuration bit has not been set, the computer system merely returns to step 174, continuing to display the error condition data. If the ESX configuration bit has been set, the data is then erased in step 178, with the SEF flag being set in step 180 if it is further determined in step 182 that the EFE erase flag enabled configuration bit has been set.

While the invention has been described in its preferred forms or embodiments with some degree of particularity, it is understood that this description has been given only by way of example, and that many variations can be made without departing from the spirit and scope of the invention, as defined in the appended claims.

What is claimed is:

1. A method for controlling operation of a hard disk drive unit comprising:
   storing secure disposal configuration data, including a user password, a master password, and data indicating a security level, in nonvolatile storage within the hard disk drive unit;
   locking the hard disk drive unit, so that data stored within the hard disk drive unit cannot be read before the hard disk drive unit is initialized for operation;
   performing a method to initialize the hard disk drive unit for operation, wherein the method to initialize the hard disk drive unit for operation comprises
   reading the disposal configuration data and determining a security level from the disposal configuration data,
   receiving a user input provided as a password,
   determining whether the user input provided as a password matches the stored user password,
   unlocking the hard disk drive unit, so that data stored within the hard disk drive unit can be read, in response to determining that the user input provided as a password matches the stored user password,
   determining whether the user input provided as a password matches the stored master password,
   unlocking the hard disk drive unit, so that data stored within the hard disk drive unit can be read, in response to determining that the user input provided as a password matches the stored master password with a low security level indicated by the data indicating a security level,
   providing a menu for erasing data stored on the hard disk drive without unlocking the hard disk drive, in response to determining that the user input provided as a password matches the stored master password with a high security level indicated by the data indicating a security level, and
   erasing data stored in the hard disk drive unit in response to determining that the user input provided as a password matches neither the stored user password nor the stored master password; and
   following initialization of the hard disk drive, measuring a failure rate of the hard disk drive unit during operation of the hard disk drive unit; and erasing data stored within the hard disk drive unit, in response to determining that the failure rate of the hard disk drive unit exceeds a level indicating that a failure of processes occurring within the disk drive that will soon cause the disposal of the hard disk drive, without allowing the data stored within the hard disk drive unit to be transferred to another storage device before erasing the data stored within the hard disk drive unit.

2. The method of claim 1 for controlling operation of a hard disk drive unit, wherein
   the method additionally comprises determining whether a configuration bit enabling automatic data erasure is set, and displaying an error message when the configuration bit is not set, and
   data stored within the hard disk drive unit is erased in response to determining that the failure rate of the hard disk drive unit exceeds a predetermined maximum level only if the configuration bit is set.

3. The method of claim 2 for controlling operation of a hard disk drive unit, wherein the failure rate measured is a soft error rate within the hard disk drive unit.

4. The method of claim 1 for controlling operation of a hard disk drive unit, wherein the failure rate measured is a soft error rate within the hard disk drive unit.

5. A method for controlling operation of a hard disk drive unit, wherein the method comprises:
   measuring a failure rate of the hard disk drive unit during operation of the hard disk drive unit; and
   erasing data stored within the hard disk drive unit in response to determining that the failure rate of the hard disk drive unit exceeds a level indicating that a failure of processes occurring within the disk drive that will soon cause the disposal of the hard disk drive, without allowing the data stored within the hard disk drive unit to be transferred to another storage device before erasing the data stored within the hard disk drive unit.

6. The method of claim 5, wherein
   the method additionally comprises determining whether a configuration bit enabling automatic data erasure is set, and displaying an error message when the configuration bit is not set, and
   data stored within the hard disk drive unit is erased in response to determining that the failure rate of the hard disk drive unit exceeds a predetermined maximum level only if the configuration bit is set.

7. The method of claim 6, wherein the failure rate measured is a soft error rate within the hard disk drive unit.

8. The method of claim 5, wherein the failure rate measured is a soft error rate within the hard disk drive unit.

9. A hard disk drive unit comprising:
   a disk assembly having data stored on the disk assembly, wherein the disk assembly is locked, so that data stored on the disk assembly cannot be read before the hard disk drive unit is initialized for operation;
   a drive mechanism operable with the disk assembly for reading and writing data thereon;

nonvolatile storage storing secure disposal configuration data including a user password, a master password, and data indicating a security level; and a microprocessor programmed to execute a method for initializing the hard disk drive unit for operation, comprising:

reading the disposal configuration data and determining a security level from the disposal configuration data, receiving a user input provided as a password, determining whether the user input provided as a password matches the stored user password, unlocking the hard disk drive unit, so that data stored within the hard disk drive unit can be read, in response to determining that the user input provided as a password matches the stored user password, determining whether the user input provided as a password matches the stored master password, unlocking the hard disk drive unit, so that data stored within the hard disk drive unit can be read, in response to determining that the user input provided as a password matches the stored master password with a low security level indicated by the data indicating a security level, providing a menu for erasing data stored on the hard disk drive without unlocking the hard disk drive, in response to determining that the user input provided as a password matches the stored master password with a high security level indicated by the data indicating a security level, and erasing data stored in the hard disk drive unit in response to determining that the user input provided as a password matches neither the stored user password nor the stored master password, wherein the microprocessor is additionally programmed to execute a method following initializing the hard disk drive comprising:

measuring a failure rate of the hard disk drive unit during operation of the hard disk drive unit; and erasing data stored within the hard disk drive unit in response to determining that the failure rate of the hard disk drive unit exceeds level indicating that a failure of processes occurring within the disk drive that will soon cause the disposal of the hard disk drive, without allowing the data stored within the hard disk drive unit to be transferred to another storage device before erasing the data stored within the hard disk drive unit.

10. The hard disk drive unit of claim 9, wherein a process for erasing data on the hard disk drive includes setting a nonvolatile bit so that the process of erasing data will continue if electrical power is turned off and then restored to the hard disk drive.

11. The hard disk drive unit of claim 9, wherein the method additionally comprises determining whether a configuration bit enabling automatic data erasure is set, and displaying an error message when the configuration bit is not set, and data stored within the hard disk drive unit is erased in response to determining that the failure rate of the hard disk drive unit exceeds a predetermined maximum level only if the configuration bit is set.

12. The hard disk drive unit of claim 11, wherein the failure rate measured is a soft error rate within the hard disk drive unit.

13. The hard disk drive unit of claim 9, wherein the failure rate measured is a soft error rate within the hard disk drive unit.

* * * * *